United States Patent
Lee et al.

(10) Patent No.: US 7,178,397 B2
(45) Date of Patent: Feb. 20, 2007

(54) APPARATUS AND METHOD FOR DRIVING MEMS STRUCTURE AND DETECTING MOTION OF THE DRIVEN MEMS STRUCTURE USING A SINGLE ELECTRODE

(75) Inventors: Sang-woo Lee, Seoul (KR); Jong-pal Kim, Seoul (KR); Byeung-leul Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 162 days.

(21) Appl. No.: 11/018,830

(22) Filed: Dec. 22, 2004

(65) Prior Publication Data
US 2005/0132806 A1    Jun. 23, 2005

(30) Foreign Application Priority Data
Dec. 22, 2003   (KR) ...................... 10-2003-0094617

(51) Int. Cl.
*G01P 9/04* (2006.01)
*G01P 15/125* (2006.01)

(52) U.S. Cl. .............................. 73/504.12; 73/514.29; 73/514.32

(58) Field of Classification Search ............. 73/504.02, 73/504.04, 504.12, 504.14, 504.15, 504.16, 73/514.32, 514.16, 514.29
See application file for complete search history.

(56) References Cited

U.S. PATENT DOCUMENTS

| | | | |
|---|---|---|---|
| 5,349,855 A | | 9/1994 | Bernstein et al. |
| 5,604,309 A | | 2/1997 | Ward |
| 5,986,497 A | * | 11/1999 | Tsugai ........................ 327/554 |
| 6,079,272 A | | 6/2000 | Stell et al. |
| 6,230,562 B1 | * | 5/2001 | Ishikawa et al. ......... 73/504.02 |
| 6,253,612 B1 | * | 7/2001 | Lemkin et al. .......... 73/504.02 |
| 6,393,914 B1 | * | 5/2002 | Zarabadi et al. ......... 73/514.04 |
| 6,731,121 B1 | * | 5/2004 | Hsu et al. .................... 324/678 |
| 2002/0059829 A1 | | 5/2002 | Sakai |

FOREIGN PATENT DOCUMENTS

EP    1 160 574 A1    12/2001

\* cited by examiner

*Primary Examiner*—Helen Kwok
(74) *Attorney, Agent, or Firm*—Sughrue Mion, PLLC

(57) ABSTRACT

Apparatus and a method for driving and detecting a motion of MEMS structure using single electrode. Apparatus includes a driving signal generation part driving MEMS structure; a motion detection part detecting motion of MEMS structure and outputting a motion current signal; an amplification part amplifying motion current signal and outputting a motion voltage signal; a gain adjustment part amplifying driving signal and outputting an amplified driving signal; a differential circuit part adding and subtracting with respect to signals output from the amplifying part and the gain adjustment part and outputting a motion signal without the driving signal; and a motion signal detection part selecting and outputting a motion signal of a predetermined frequency from the motion signal output from the differential circuit part. The variable capacitor is configured by a movable electrode plate integrally formed with MEMS structure and a fixed electrode plate disposed opposite to the movable electrode plate.

9 Claims, 4 Drawing Sheets

APPARATUS AND METHOD FOR DRIVING MEMS STRUCTURE AND DETECTING MOTION OF THE DRIVEN MEMS STRUCTURE USING A SINGLE ELECTRODE

CROSS-REFERENCE TO RELATED APPLICATIONS

This application claims the benefit of Korean Patent Application No. 2003-94617, filed on Dec. 22, 2003, in the Korean Intellectual Property Office, the disclosure of which is incorporated herein by reference.

BACKGROUND OF THE INVENTION

1. Field of the Invention

The present invention relates to an apparatus and a method for driving a MEMS (Micro Electro Mechanical Systems) structure and detecting the motion of the driven MEMS structure.

2. Description of the Related Art

MEMS has realized the integration of mechanical components into microelectronic elements using semiconductor processes, and promises to revolutionize numerous industrial fields including electronics, mechanics, medical, and defense industries. MEMS makes it possible to realize machines and equipments having a hyperfine structure under several μm. Especially, sensors fabricated in a hyperfine structure through MEMS technology are embedded in compact devices such as a cellular phone and detect the mechanical motion in the range of several ten nm~several μm as an electronic signal of several pico F. The displacement of the MEMS structure is detected using the amount by which capacitance changes. A conventional apparatus for driving a MEMS structure and detecting the motion of the driven MEMS structure is described below.

FIG. 1 is a circuit diagram showing the conventional apparatus for driving a MEMS structure and detecting the motion of the driven MEMS structure. Referring to FIG. 1, the apparatus comprises a driving source 5, a first variable capacitor 6a being supplied with a driving signal from the driving source 5 to drive the MEMS structure, a second variable capacitor 6b serially connected to the first variable capacitor 6a, for detecting the motion of the MEMS structure and supplying a motion signal, and an amplifying circuit 8 connected to the second variable capacitor 6b, for outputting an amplified voltage signal $V_{out}$ with respect to an input signal in a current form.

FIG. 2 is a view showing configurations of the first and the second variable capacitors 6a and 6b of FIG. 1. Referring to FIG. 2, the conventional apparatus for driving the MEMS structure and detecting the motion of the driven MEMS structure comprises a first fixed electrode plate 11a supplied with the driving signal, a second fixed electrode plate 11b disposed apart from the first fixed electrode plate 11b by a predetermined distance and opposite to the first fixed electrode plate 11b, and a movable electrode plate 15 integrally formed with the MEMS structure 14, which is supported on a spring 12 and a damper 13 to be movable to a predetermined direction, and located between the first an second fixed electrode plates 11a and 11b. The first variable capacitor 6a is embodied by the first fixed electrode plate 11a and the movable electrode plate 15, and the second variable capacitor 6b is embodied by the movable electrode plate 15 and the second fixed electrode plate 11b.

In the conventional driving of the MEMS structure and detecting of the motion of the driven MEMS structure, it is necessary to comprise a driving electrode for driving the MEMS structure 14 and a detecting electrode for detecting the motion of the MEMS structure 14, separately. Due to the addition of the detecting electrode which does not contribute to the driving of the MEMS structure 14, a problem of volume increase is created in the system that is required to be small-sized.

SUMMARY OF THE INVENTION

The present invention has been developed in order to solve the above problem in the related art. Accordingly, an aspect of the present invention is to provide an apparatus for driving a MEMS structure and detecting the motion of the driven MEMS structure using a single electrode.

The above aspect is achieved by providing an apparatus for driving a MEMS structure and detecting motion of the driven MEMS structure using a single electrode, comprising: a driving signal generation part for generating and outputting a driving signal to drive the MEMS structure; a motion detection part configured by one single variable capacitor, for detecting the motion of the MEMS structure driven according to the driving signal and outputting a motion current signal corresponding to the motion of the MEMS structure; an amplification part for amplifying the motion current signal output from the motion detection part and outputting a motion voltage signal; a gain adjustment part for amplifying the driving signal input from the driving signal generation part and outputting a driving signal amplified by a predetermined gain; a differential circuit part for performing adding and subtracting operations with respect to the respective signals output from the amplifying and the gain adjustment part and outputting a motion signal without the driving signal by which the driving signal is compensated; and a motion signal detection part for selecting and outputting a motion signal of a predetermined frequency out of the motion signals output from the differential circuit part.

The variable capacitor may be configured by a movable electrode plate integrally formed with the MEMS structure and supplied with the driving signal and a fixed electrode plate disposed opposite to the movable electrode plate and virtually grounded.

The amplification part may comprise: an amplifier having a negative input terminal connected to the fixed electrode plate, a positive terminal connected to a grounded electrode, and an output terminal; and a first capacitor connected to the amplifier in parallel.

The variable capacitor may be configured by a movable electrode plate integrally formed with the MEMS structure, and a fixed electrode plate disposed opposite to the movable electrode plate, supplied with the driving signal, and virtually grounded.

The amplification part may comprise: an amplifier having a negative input terminal connected to the fixed electrode plate, a positive input terminal connected to the driving signal generation part, and an output terminal; and a second capacitor connected to the amplifier in parallel.

The motion signal detection part may be a band pass filter, and the gain adjustment part may be an amplifier for amplifying the driving signal to the amplitude of the driving signal included in the motion signal output from the amplification part.

Another aspect of the invention includes a method for achieving the above.

BRIEF DESCRIPTION OF THE DRAWINGS

The above aspect and other advantages of the present invention will be more apparent by describing embodiments of the present invention with reference to the accompanying drawings, in which.

DETAILED DESCRIPTIONS OF THE EXEMPLARY EMBODIMENTS

Hereinafter, the present invention will be described in detail with reference to the accompanying drawings.

Figure 1:
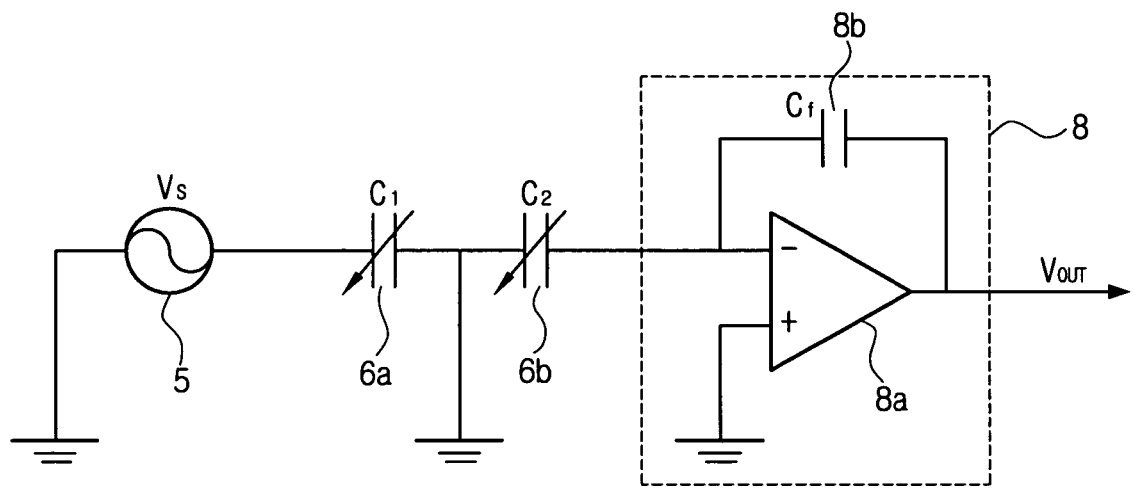
FIG. 1 is a circuit diagram showing a conventional apparatus for driving a MEMS structure and detecting motion of the driven MEMS structure.
Figure 2:
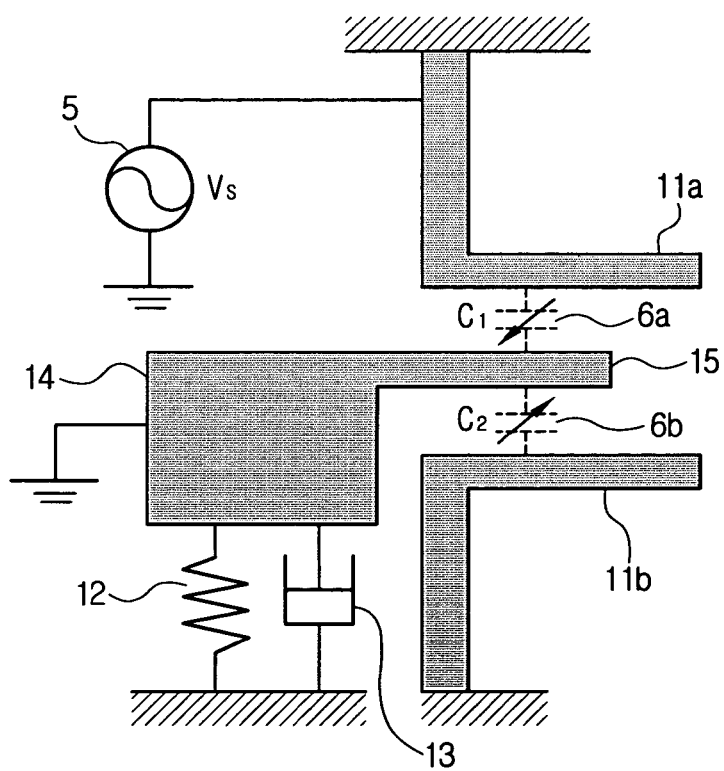
FIG. 2 is a view showing the configurations of the first and the second variable capacitors of FIG. 1.
Figure 3:
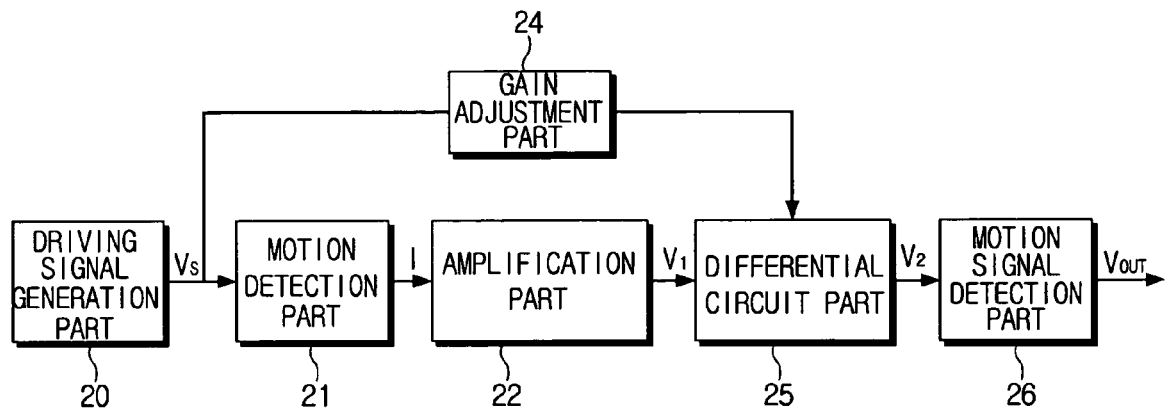
FIG. 3 is a block diagram showing an apparatus for driving a MEMS structure and detecting motion of the driven MEMS structure according to an embodiment of the present invention.

FIG. 3 is a block diagram showing an apparatus for driving a MEMS structure and detecting motion of the driven MEMS structure according to an embodiment of the present invention. Referring to FIG. 3, the apparatus for driving a MEMS structure and detecting motion of the driven MEMS structure comprises a driving signal generation part 20, a motion detection part 21, an amplification part 22, a gain adjustment part 24, a differential circuit part 25, and a motion signal detection part 26.

The driving signal generation part 20 may be embodied as a voltage source or a current source for outputting a driving signal $V_s$ in a periodic square wave or sine wave form to drive the MEMS structure.

The motion detection part 21 detects motion information of the MEMS structure driven in response to the driving signal $V_s$ and supplies a motion signal I. The motion signal I obtained by the motion detection part 21 contains the driving signal $V_s$. The motion detection part 21 is embodied by a variable capacitor consisting of a movable electrode plate integrally formed with the MEMS structure and a fixed electrode. The MEMS structure, which is subjected to the motion detection, such as electrostatic accelerators, actuators, and gyroscopes has to be modeled by the variable capacitor. Accordingly, the detection of change in a capacitance of the variable capacitor enables obtaining the motion information of the MEMS structure.

The amplification part 22 transforms the motion signal I in a current form supplied from the motion detection part 21 into an amplified motion signal $V_1$ in a voltage form and outputs the transformed signal. The amplification part 22 may be embodied by a charge amplifier constructed by the combination of an amplifier and a capacitor.

The gain adjustment part 24 is connected to the motion detection part 21 in parallel, for amplifying the driving signal $V_s$ output from the driving signal generation part 20 by a predetermined gain. The gain adjustment part 24 may be embodied by the combination of an operational amplifier and a resistor or a capacitor connected to the operational amplifier in parallel, or may be embodied by a variable resistor or a multiplier.

The differential circuit part 25 is supplied with the amplified motion signal $V_1$ including the driving signal and the driving signal amplified by the gain adjustment part 24, and performs addition and subtraction with respect to the signals. Here, the gain adjustment 24 adjusts the gain to make the driving signal included in the amplified motion signal $V_1$ equal to the driving signal input into the differential circuit part 25 after passing through the gain adjustment part 24, in amplitude. Also, the differential circuit part 25 is operated so that the two input driving signals are counterbalanced by each other. Accordingly, a motion signal $V_2$ output from the differential circuit part 25 excludes the driving signal $V_s$.

Because the motion signal $V_2$ supplied to the motion signal detection part 26 includes a signal corresponding to the change amount ($\Delta C$) of the capacitance, as well as a DC signal corresponding to a nominal capacitance $C_0$ and a second high frequency signal, it is necessary to remove these signals. The motion signal detection part 26 blocks these unnecessary signals and detects and outputs only the motion signal $V_{out}$ corresponding to the change amount ($\Delta C$) of the capacitance.

Figure 4:
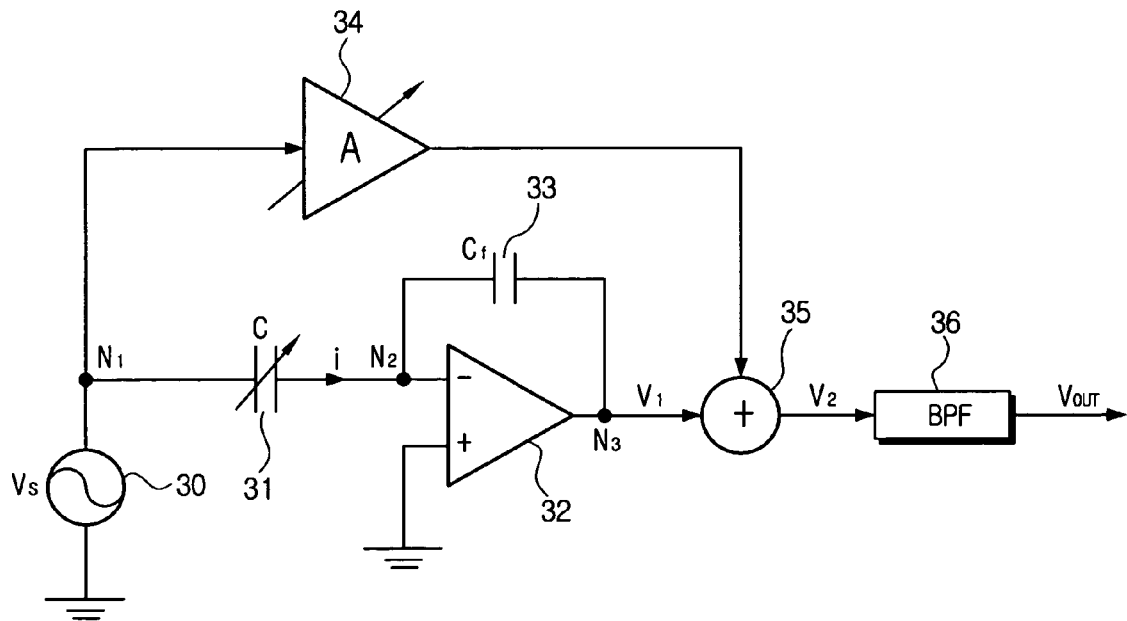
FIG. 4 is a circuit diagram showing a first example of the apparatus for driving a MEMS structure and detecting the motion of the driven MEMS structure according to the embodiment of the present invention.

FIG. 4 is a circuit diagram showing a first example of an apparatus for driving a MEMS structure and detecting motion of the driven MEMS structure according to an embodiment of the preset invention. Referring to FIG. 4, a driving signal $V_s$ output from a driving source 30 and having a predetermined frequency ω is separated at a node 1 $N_1$ to be supplied to a variable capacitor 31 and a variable amplifier 34.

Figure 5:
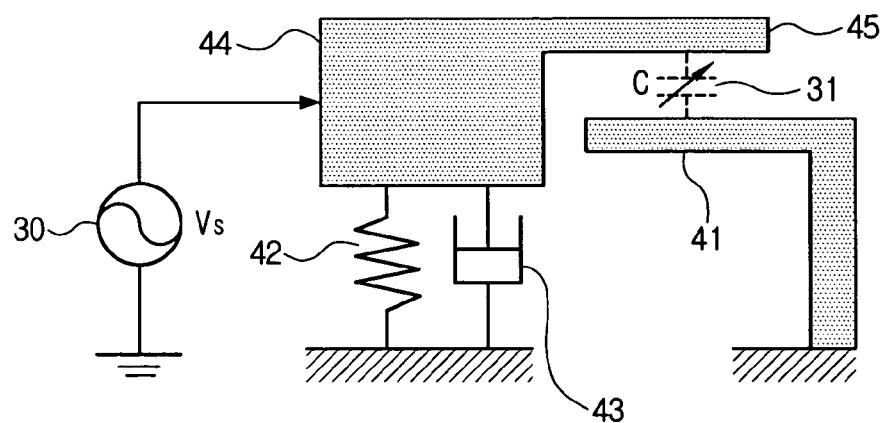
FIG. 5 is a view showing the variable capacitor of FIG. 4.

The configuration of the variable capacitor 31 is described below with reference to the FIG. 5. The variable capacitor 31 is embodied by a fixed electrode plate 41 and a movable electrode plate 45 integrally formed with a movable MEMS structure 44. When the driving signal $V_s$ of the frequency ω is supplied to the movable electrode plate 45, the MEMS structure 44 supported on a spring 42 and a damper 43 and the movable electrode plate 45 vibrate with the frequency ω in response to the driving signal $V_s$. That is, the motion of the movable electrode plate 45 causes the capacitance C ($C_0+\Delta C$) of the variable capacitor 31, which consists of the two electrode plates 41 and 45, to be changed. Information about the change in the capacitance C is output as a signal in a current form.

Meanwhile, referring back to FIG. 4, since an amplifier 32 has a positive terminal connected to a grounded electrode, an electrical potential at a node 2 $N_2$ becomes 0 and a current signal flowing from the variable capacitor 31 to the node 2 $N_2$ is output to a capacitor $C_f$. This is expressed by the following equation 1:

$$\frac{d}{dt}[C(V_s - 0)] = \frac{d}{dt}[C_f(0 - V_1)] \qquad \text{[Equation 1]}$$

wherein, $V_1$ denotes an electrical potential at a node 3 $N_3$. The equation 1 makes the following equation 2. That is, the amplified output signal $V_1$ is obtained by the following equation 2:

$$V_1 = -\frac{C}{C_f}V_s \qquad \text{[Equation 2]}$$

wherein, because of $C=C_0+\Delta C$ and $V_s=V_{sdc}+V_{sac}$, the output signal $V_1$ includes a DC signal, a capacitance change signal of the frequency $\omega$, the driving signal $V_s$ of the frequency $\omega$, and a signal of a frequency $2\omega$.

The variable amplifier 34 amplifies the input driving signal $V_s$ by a predetermined gain to make the driving signal $V_s$ equal to the driving signal of the frequency $\omega$ of the output signals $V_1$ in an amplitude and outputs the amplified signal to an adder 35. The adder 35 performs an operation to counterbalance the two input driving signals of the frequency $\omega$ and output a signal $V_2$ to a band pass filter (BPF) 36. The band pass filter 36 selects and outputs only the motion signal $V_{out}$ of the frequency $\omega$ among the input signals $V_2$. Using the selected motion signal $V_{out}$, information about the motion of the variable capacitor 31, i.e., the motion of the MEMS structure can be obtained.

Figure 6:
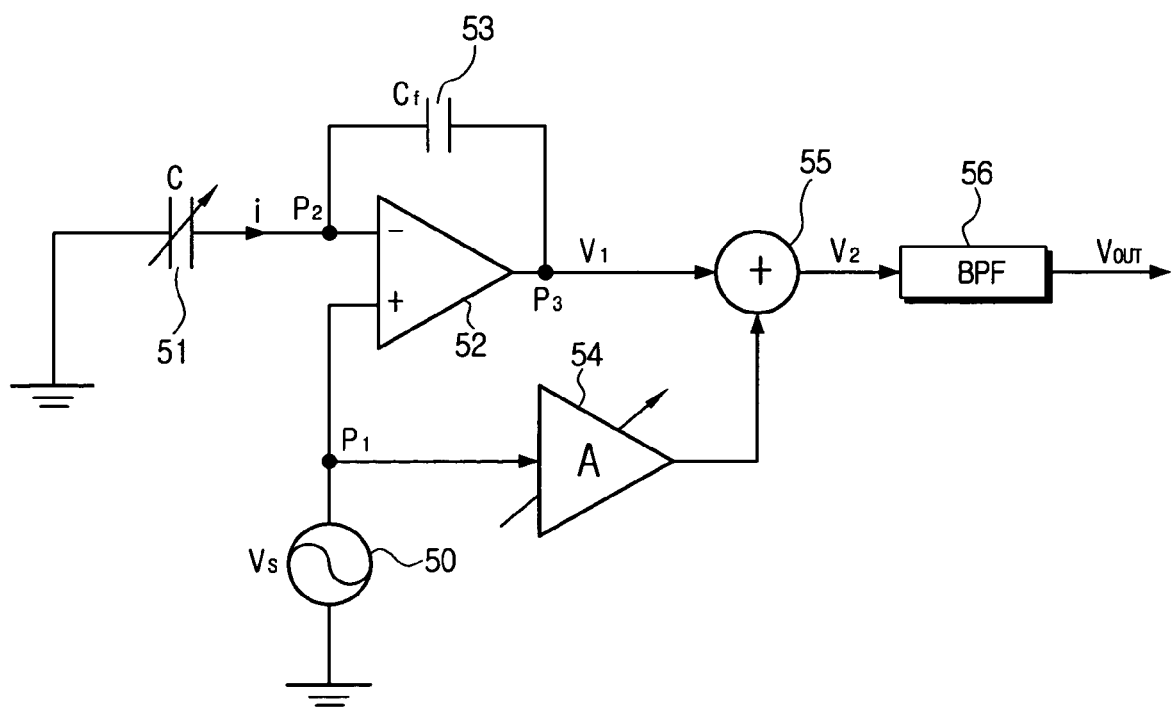
FIG. 6 is a circuit diagram showing a second example of the apparatus for driving a MEMS structure and detecting the motion of the driven MEMS structure according to the embodiment of the present invention.

FIG. 6 is a circuit diagram showing a second example of an apparatus for driving a MEMS structure and detecting motion of the driven MEMS structure according to an embodiment of the present invention. Referring to FIG. 6, a driving signal $V_s$ output from a driving source 50 and having a predetermined frequency $\omega$ is separated at a node 1 $P_1$ to be supplied to a positive terminal of an amplifier 52 and a variable amplifier 54. To a negative terminal of the amplifier 52 is connected a variable capacitor 51 having one end connected to a grounded electrode.

Figure 7:
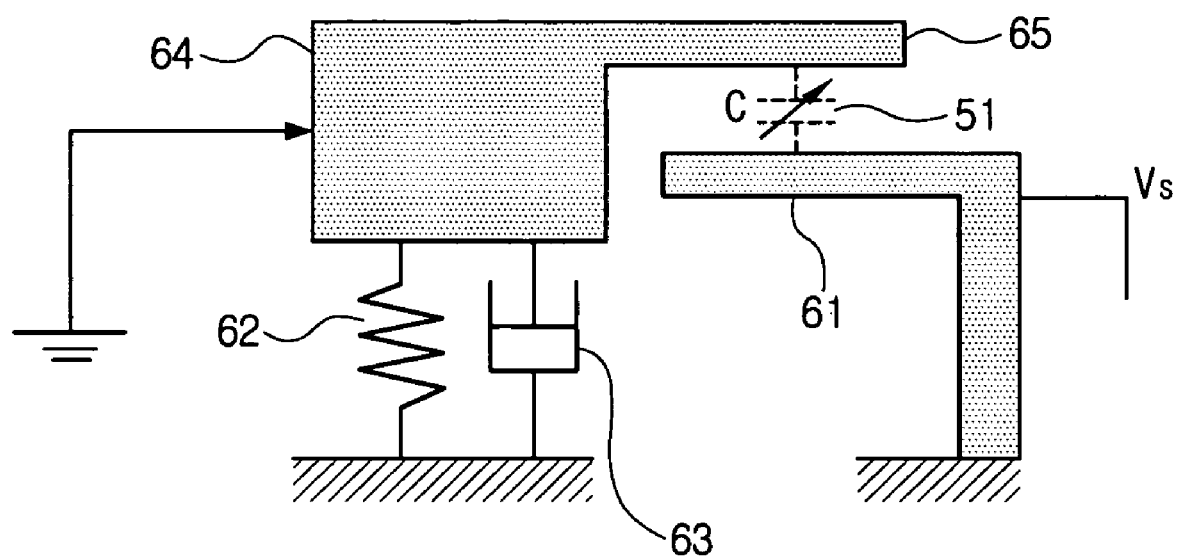
FIG. 7 is a view showing the variable capacitor of FIG. 6.

The configuration of the variable capacitor 51 is described below with reference to FIG. 7. The variable capacitor 51 is embodied by a fixed electrode plate 61 to be supplied with the driving signal $V_s$ and a movable electrode plate 65 integrally formed with a MEMS structure 64. When the driving signal $V_s$ of the frequency $\omega$ is supplied to the fixed electrode plate 61, the MEMS structure 64 supported on a spring 62 and a damper 63 and the movable electrode plate 65 vibrate with the frequency $\omega$ in response to the driving signal $V_s$. That is, the motion of the movable electrode plate 65 causes a capacitance $C$ ($C_0+\Delta C$) of the variable capacitor 51 consisting of the two electrode plates 61 and 65 to be changed. Information about the change in the capacitance $C$ is output as a signal i in a current form.

Meanwhile, referring back to FIG. 6, an electrical potential at a node 2 $P_2$ becomes the driving signal $V_s$ and the current signal i flowing from the variable capacitor 51 to the node 2 $P_2$ is output to a capacitor $C_f$ 53. This is expressed by the following equation:

$$\frac{d}{dt}[C(0-V_s)] = \frac{d}{dt}[C_f(V_s - V_1)] \qquad \text{[Equation 3]}$$

wherein, $V_1$ denotes an electrical potential at a node 3 $P_3$. The equation 3 makes the following equation 4 from which an amplified output signal $V_1$ is obtained;

$$V_1 = \left(1 + \frac{C}{C_f}\right)V_s \qquad \text{[Equation 4]}$$

wherein, because $C=C+\Delta C$ and $V_s=V_{sdc}+V_{sac}$, the output signal $V_1$ includes a DC signal, a capacitance change signal of the frequency $\omega$, the driving signal of the frequency $\omega$, and a signal of a frequency $2\omega$.

The variable amplifier 54 amplifies the input driving signal Vs by a predetermined gain to the amplitude of the driving signal of frequency $\omega$ among the output signals $V_1$, and outputs the amplified signal to an adder 55. The adder 55 performs an operation so that the two input driving signals of the frequency $\omega$ are counterbalanced by each other, and outputs a signal $V_2$ to a band pass filter (BPF) 56. The band pass filter 56 selects and outputs only the motion signal $V_{out}$ of the frequency $\omega$ of the input signals $V_2$. Using the selected motion signal $V_{out}$, information about the motion of the variable capacitor 51, i.e., the motion of the MEMS structure is obtained.

Another embodiment of the invention includes a method for driving a MEMS (Micro Electro Mechanical System) structure and detecting motion of the driven MEMS structure using a single electrode. The method includes generating and outputting a first driving signal to drive the MEMS structure. The motion of the MEMS structure driven according to the first driving signal is detected with a variable capacitor and a motion current signal corresponding to the motion of the MEMS structure is outputted. The motion current signal is amplified and a motion voltage signal is outputted. The first driving signal input is amplified and a second driving signal amplified by a predetermined gain is outputted. Adding and subtracting operations with respect to the motion voltage signal and the second driving signal is performed and a motion signal without the second driving signal is outputted. A motion signal of a predetermined frequency is selected and outputted from the motion signal.

Yet another embodiment of the invention includes the embodiment described above wherein the variable capacitor includes a movable electrode plate integral to the MEMS structure and supplied with the first driving signal and a fixed electrode plate disposed opposite to the movable electrode plate and virtually grounded.

As described above, according to the present invention, the apparatus for driving the MEMS structure and detecting the motion of the driven MEMS structure is embodied by one single electrode, which reduces overall size of the MEMS structure and also increases voltage efficiency.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for driving a MEMS (Micro Electro Mechanical System) structure and detecting motion of the driven MEMS structure using a single electrode, comprising:

a driving signal generation part for generating and outputting a first driving signal to drive the MEMS structure;

a motion detection part comprising a variable capacitor, for detecting the motion of the MEMS structure driven according to the first driving signal and outputting a motion current signal corresponding to the motion of the MEMS structure;

an amplification part for amplifying the motion current signal output from the motion detection part and outputting a motion voltage signal;

a gain adjustment part for amplifying the first driving signal input from the driving signal generation part and outputting a second driving signal amplified by a predetermined gain;

a differential circuit part for performing adding and subtracting operations with respect to the motion voltage signal output from the amplification part and the second driving signal output from the gain adjustment part and outputting a motion signal without the second driving signal; and a motion signal detection part for selecting and outputting a motion signal of a predetermined frequency out of the motion signal output from the differential circuit part.

2. The apparatus as claimed in claim 1, wherein the variable capacitor comprises a movable electrode plate integral to the MEMS structure and supplied with the first driving signal and a fixed electrode plate disposed opposite to the movable electrode plate and virtually grounded.

3. The apparatus as claimed in claim 2, wherein the amplification part comprises:

an amplifier having a negative input terminal connected to the fixed electrode plate, a positive terminal connected to a grounded electrode, and an output terminal; and a first capacitor connected to the amplifier in parallel.

4. The apparatus as claimed in claim 1, wherein the variable capacitor comprises a movable electrode plate integral to the MEMS structure and grounded, and a fixed electrode plate disposed opposite to the movable electrode plate and supplied with the first driving signal.

5. The apparatus as claimed in claim 4, wherein the amplification part comprises:

an amplifier having a negative input terminal connected to the fixed electrode plate, a positive input terminal connected to the driving signal generation part, and an output terminal; and a first capacitor connected to the amplifier in parallel.

6. The apparatus as claimed in claim 1, wherein the motion signal detection part is a band pass filter.

7. The apparatus as claimed in claim 1, wherein the gain adjustment part is an amplifier for amplifying the first driving signal to an amplitude of a third driving signal included in the motion signal output from the amplification part.

8. A method for driving a MEMS (Micro Electro Mechanical System) structure and detecting motion of the driven MEMS structure using a single electrode, comprising:

generating and outputting a first driving signal to drive the MEMS structure;

detecting the motion of the MEMS structure driven according to the first driving signal with a variable capacitor and outputting a motion current signal corresponding to the motion of the MEMS structure;

amplifying the motion current signal and outputting a motion voltage signal;

amplifying the first driving signal by a predetermined gain to generate a second driving signal and outputting the amplified second driving signal;

performing adding and subtracting operations with respect to the motion voltage signal and the second driving signal and outputting a motion signal without the second driving signal; and selecting and outputting a motion signal of a predetermined frequency from the motion signal without the second driving signal.

9. The method as claimed in claim 8, wherein the variable capacitor comprises a movable electrode plate integral to the MEMS structure and supplied with the first driving signal and a fixed electrode plate disposed opposite to the movable electrode plate and virtually grounded.

* * * * *